May 16, 1950  D. DUFFEY  2,508,234
DISTILLATION APPARATUS
Filed April 24, 1944
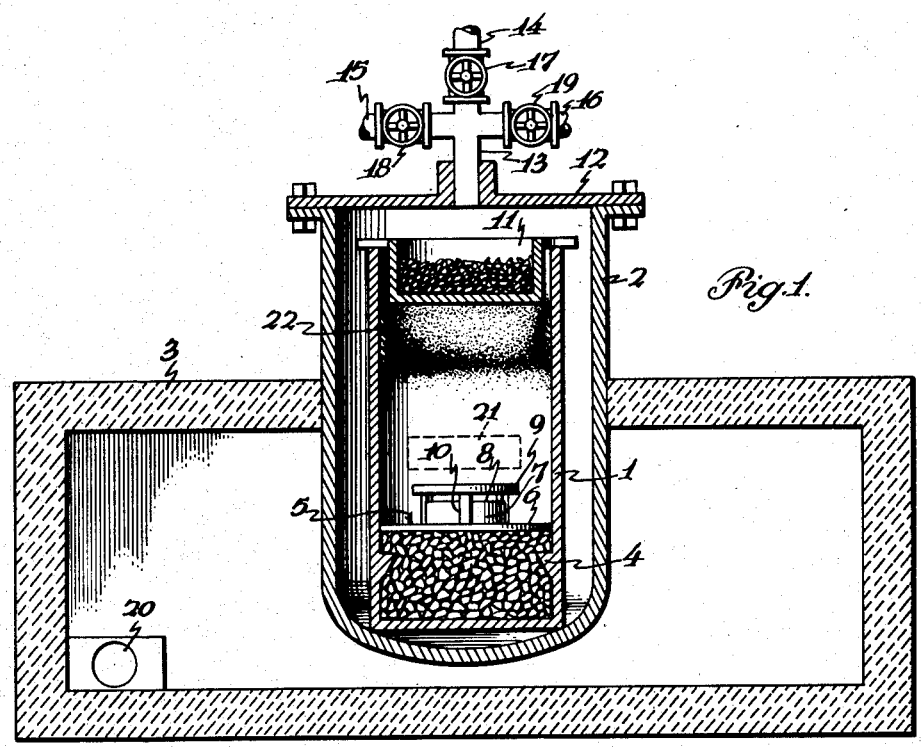
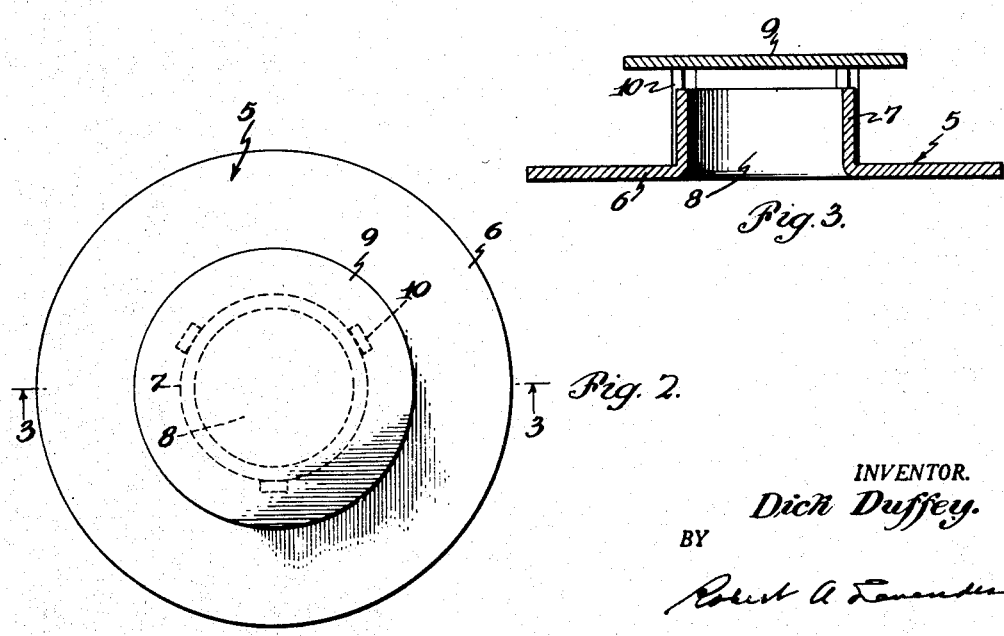
INVENTOR.
Dick Duffey.
BY Patented May 16, 1950

2,508,234

UNITED STATES PATENT OFFICE 2,508,234

DISTILLATION APPARATUS

Dick Duffey, La Fontaine, Ind., assignor to the United States of America as represented by the United States Atomic Energy Commission Application April 24, 1944, Serial No. 532,432

6 Claims. (Cl. 202—197)

This invention relates to new and useful improvements in apparatus for the distillation of materials, and more particularly for the distillation of alkaline earth metals in the production of substantially pure alkaline earth metal hydrides.

Prior to the present invention relatively pure alkaline earth metal hydrides, and particularly calcium hydrides, have been produced by distilling a crude form of the particular alkaline earth metal in a suitable retort from which air has been evacuated, and then reacting the distilled metal with hydrogen to produce the relatively pure hydride.

While alkaline earth metal hydrides produced in accordance with the foregoing method are comparatively pure, it has been found that for certain uses the metal hydride produced contains impurities above the acceptable limits with the result that the hydride product usually must be rejected and discarded. It has been determined that the presence of such impurity above the acceptable limits, is due to residual impurity in the crude calcium that is entrained and carried by the distilled calcium vapors to the upper part of the retort and into contact with the distilled calcium that has condensed and collected upon the upper well portion of the retort.

With the foregoing in mind, the principal object of the present invention is to provide a novel apparatus for the production of alkaline earth metal hydrides of high purity.

Another object of the invention is to provide a novel apparatus comprising a baffle structure that functions effectively to de-entrain, from the rising distilled vapors, impurities that may tend to be entrained and carried by the vapors into contact with the condensed distillate.

These and other objects of the invention, and the various features and details of the construction and operation thereof, are hereinafter fully set forth and described with reference to the accompanying drawings, in which:

Figure 1 is a sectional view taken vertically through apparatus embodying the present invention.

Figure 2 is top plan view of a baffle structure made according to the invention, and Figure 3 is a sectional view taken on line 3—3 Figure 2.

According to the present invention, a charge of relatively crude calcium, that is contaminated with indigenous impurities such as sodium and potassium, and other metals, as well as various chlorides of these and other metals, is placed in the bottom of an inner retort 1 disposed within an outer retort 2 that is positioned within a heating furnace 3 so that the upper portion of the outer retort 2, as well as the upper portion of the inner retort 1, extend above and exteriorly of the furnace 3 as shown.

On the interior surface of the inner retort 1, adjacent the bottom thereof, there is provided a plurality of lugs or projections 4 that are arranged to support a baffle structure 5 during the calcium distillation stage of the process. As shown in the drawing, the baffle structure 5 comprises an annular base portion 6 having an annular upstanding flange or collar portion 7 that defines a tubular passage or opening 8 centrally through the structure, and a hood member or de-entrainment head 9 that is adapted to overlie the upper end opening of the throat 8 in spaced relation with respect thereto. The hood or head 9 may be supported above the top opening of the throat 8 by a plurality of legs or the like 10 that depend from the hood 9 and are positioned to engage the flange 7 axially thereof at circumferentially spaced points thereabout. The lower ends of the legs 10 engage the upper surface of the baffle base 6, and the length thereof is sufficiently greater than the height of the flange 7 to support the hood 9 in properly spaced relation with respect to the upper end of said flange 7. The diameter of the baffle base portion 6 should be just slightly less than the internal diameter of the inner retort 1 so that there is a minimum clearance between the retort wall and the baffle structure 5.

The relatively crude calcium is placed in the bottom of the inner retort 1, as previously stated, to a depth substantially above the level of the upper surfaces of the lugs or projections 4 on the interior surface of said retort 1, and the baffle structure 5 is positioned within the retort with its base 6 resting upon the surface of the calcium charge in the relation shown in the drawing.

A tray 11 to receive a quantity of a suitable oxidizing agent is supported across the open top of the retort 1, and the opening of the outer retort 2 is provided with a suitable closure or cover 12. Extending through the cover 12 is the vertical branch 13 of a triple branch pipe system that leads interiorly of the retort 2. This triple pipe system comprises branch pipes 14, 15 and 16, each of which is provided with a suitable valve, 17, 18, and 19, respectively. In the illustrated embodiment of the invention, the branch pipes 15 and 16 are connected with a source of hydrogen and a source of helium, respectively, and the branch 14 is connected to a suitable source of vacuum such as a vacuum pump (not shown). The retorts 1 and 2, and the contents of the latter, may be heated, for example, by means of hot gases introduced through a port 20 into the furnace 3 where they circulate around the outer retort 2, and then pass outwardly through a suitably located flue 21 to the exterior atmosphere.

In operation, and with the relatively crude calcium charge and baffle structure 5 positioned within the retort 1 as previously described, a quantity of a suitable refractory metal oxide such as, for example, titanium oxide is placed in the tray 11, and the cover 12 is placed upon the outer retort 2 and locked thereon to provide a sealed, air-tight joint. The valve 17 of the branch pipe 14 of the triple pipe system is then opened, the valves 18 and 19 of the other branches 15 and 16 being closed, and the inner and outer retorts 1 and 2 are placed under a vacuum to remove objectionable air therefrom.

Heated gases are now introduced into the furnace 3 through the port 20 therein to heat the outer and inner retorts 1 and 2, and the calcium charge contained within the latter. As the lower portions of the outer and inner retorts 1 and 2 are heated and the temperature rises, a temperature is reached at which the vapors of the sodium and potassium impurities rise to the upper and cooler portion of the retort 1 where they come into contact with the metal oxide material in the tray 11. Due to their good affinity for oxygen, the sodium and potassium are promptly oxidized, and the titanium oxide in tray 11 is reduced to titanium, and a sub-oxide of titanium, according to reactions that may be indicated as follows:

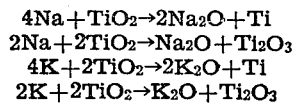

As the temperature at the bottom of the inner retort 1 continues to rise, the calcium charge at the bottom of the retort becomes molten with the result that the charge is substantially reduced in volume to the extent that the surface level thereof recedes to a level below the upper surface of the lugs or projections 4 on the interior surface of the retort 1. During this transition of the charge from a solid to a molten state, and as the surface level of the charge gradually recedes within the retort 1, the baffle structure 5, resting thereon, follows downwardly with the charge until the base 6 of the baffle structure 5 ultimately comes to rest upon, and is supported by, the aforesaid lugs or projections 4.

Continued heating of the inner retort 1 further elevates the temperature to the temperature at which the calcium is distilled, and the resulting calcium vapors rise upwardly through the passage 8 in the collar 7 of the baffle structure 5, impinge against the underside of the hood 9 and then pass laterally outward from beneath the hood 9 to the upper portion of the retort 1 where they tend to condense and settle out against the retort upper wall portion immediately below the tray 11 as indicated at 22. During distillation of the calcium, there exists a tendency for certain residual impurities in the charge to become entrained in the rising calcium vapors and these impurities are de-entrained from the rising calcium vapors by means of the hood 9 of the baffle structure 5, against which the gases or the vapors rising through the throat 8 of the baffle structure impinge, with the result that such impurities as are entrained in the rising vapors are de-entrained therefrom and caused to return to the bottom of the retort 1.

When the distillation of the calcium is complete, introduction of the heated gases to the furnace 3 is stopped and the retorts are allowed to cool to a temperature at which the distilled calcium can be converted to calcium hydride without disassociation. At this temperature, the vacuum is broken by opening the valve 18 in the branch pipe 15 to admit hydrogen into the interior of the retorts, sufficient hydrogen being introduced to effect complete conversion of the condensed distilled calcium to calcium hydride. For this purpose, under practical operating conditions, the retorts are allowed to cool to about 400° C. prior to introduction to hydrogen. If the reaction proceeds too rapidly, the hydrogen is advantageously diluted with an inert or neutral gas, such as helium, that is admitted to the retorts by opening the valve 19 of the branch pipe 16. As this dilution slows the reaction, it may be carried on to completion under complete control.

The end of the reaction is indicated when a sufficient quantity of hydrogen has been absorbed by a chemically equivalent weight of the distilled calcium. The retort is then cooled to room temperature, the hydrogen is displaced by air, and the retort is opened. Since all of the potassium and sodium impurities have been absorbed by the reaction with titanium oxide, and since all residual impurities have been de-entrained from the rising distilled calcium vapors by means of the novel baffle structure 5, a substantially pure hydride product is obtained.

From the foregoing, it will be observed that the present invention provides a novel apparatus for producing substantially pure alkaline earth metal hydrides by distillation, wherein residual impurities that may tend to be entrained and carried by the rising distillate vapors into contact with the condensed distillate, are effectively and completely de-entrained from the distilled vapors, and while a particular embodiment of the invention has been set forth and described herein, it is not intended that the invention be limited to the details of the disclosure, but that changes and modifications within the spirit of the invention may be made within the scope of the appended claims.

I claim:

1. Apparatus for purifying alkaline earth metals by distillation, comprising a vessel to receive a relatively crude charge of a selected alkaline earth metal to a given depth, means for heating said vessel, and a baffle structure in said vessel having a base arranged to rest upon and substantially cover the surface of said charge and to move downwardly within the vessel in surface contact with the charge as the latter melts and decreases in depth, the base of said baffle having an opening therethrough for the upward passage of vapors distilled from the charge, and said baffle structure including also a member overlying said opening arranged for impingement by said distilled vapors and operable to de-entrain impurity therefrom and to return said impurity to the bottom of said vessel.

2. Apparatus for purifying alkaline earth metals by distillation, comprising a vessel to receive a relatively crude charge of a selected alkaline earth metal to a given depth, means for heating said vessel, and a baffle structure in said vessel having an annular base arranged to rest upon and substantially cover the surface of said charge and to move downwardly within the vessel in surface contact with the charge as the latter melts and decreases in depth, means surrounding the opening defined by said annular base and forming a tubular passage for the upward passage of vapors distilled from the charge and a member overlying said tubular passage arranged for impingement by said distilled vapors and operable to de-entrain impurity therefrom and to return said impurity to the bottom of said vessel.

3. Apparatus for purifying alkaline earth metals by distillation, comprising a vessel to receive a relatively crude charge of a selected alkaline earth metal to a given depth, means for heating said vessel, and a baffle structure in said vessel having an annular base arranged to rest upon and substantially cover the surface of said charge and to move downwardly within the vessel in surface contact with the charge as the latter melts and decreases in depth, an upstanding flange surrounding the opening defined by said annular base and forming a tubular passage for the upward passage of vapors distilled from the charge and a hood member supported in overlying spaced relation with respect to the upper end of said flange and projecting radially therebeyond, said hood member being arranged for impingement by said distilled vapors and operable to de-entrain impurity therefrom and to return said impurity to the bottom of said vessel.

4. Apparatus for purifying alkaline earth metals by distillation, comprising a vessel to receive a relatively crude charge of a selected alkaline earth metal to a given depth, means for heating said vessel, and a baffle structure in said vessel having a base arranged to rest upon the surface of said charge and to move downwardly within the vessel in surface contact with the charge as the latter melts and decreases in depth, projections on the inner wall surface of said vessel below the initial surface level of the charge therein, and operable to engage and limit downward movement of the baffle structure, the base of said baffle having an opening therethrough for the upward passage of vapors distilled from the charge, and said baffle structure including also a member overlying said opening arranged for impingement by said distilled vapors and operable to de-entrain impurity therefrom and to return said impurity to the bottom of said vessel.

5. Apparatus for purifying alkaline earth metals by distillation, comprising a vessel to receive a relatively crude charge of a selected alkaline earth metal to a given depth, means for heating said vessel, and a baffle structure in said vessel having an annular base arranged to rest upon the surface of said charge and to move downwardly within the vessel in surface contact with the charge as the latter melts and decreases in depth, projections on the inner wall surface of said vessel below the initial surface level of the charge therein and operable to engage and limit downward movement of the baffle structure, and operable to engage and limit downward movement of the baffle, means surrounding the opening defined by said annular base and forming a tubular passage for the upward passage of vapors distilled from the charge and a member overlying said tubular passage arranged for impingement by said distilled vapors and operable to de-entrain impurity therefrom and to return said impurity to the bottom of said vessel.

6. Apparatus for purifying alkaline earth metals by distillation, comprising a vessel to receive a relatively crude charge of a selected alkaline earth metal to a given depth, means for heating said vessel, and a baffle structure in said vessel having an annular base arranged to rest upon the surface of said charge and to move downwardly within the vessel in surface contact with the charge as the latter melts and decreases in depth, projections on the inner wall surface of said vessel below the initial surface level of the charge therein and operable to engage said baffle and limit downward movement thereof, an upstanding flange surrounding the opening defined by said annular base and forming a tubular passage for the upward passage of vapors distilled from the charge and a hood member supported in overlying spaced relation with respect to the upper end of said flange and extending radially therebeyond, said hood member being arranged for impingement by said distilled vapors and operable to de-entrain impurity therefrom and to return said impurity to the bottom of said vessel.

DICK DUFFEY.

REFERENCES CITED

The following references are of record in the file of this patent:

UNITED STATES PATENTS

| Number | Name | Date |
|---|---|---|
| 540,655 | Farmer | June 11, 1895 |
| 1,069,829 | Thoens | Aug. 12, 1913 |
| 1,287,949 | Fricker | Dec. 17, 1917 |
| 1,414,993 | Milburn | May 2, 1922 |
| 1,936,964 | Gensecke | Nov. 28, 1933 |
| 2,341,321 | Holzworth | Feb. 8, 1944 |